United States Patent Office 3,232,791
Patented Feb. 1, 1966

3,232,791
REGENERATED CELLULOSE FILM HAVING A MOISTUREPROOF COATING
Alan Brack Whitehouse, Tonawanda, N.Y., assignor to E. I. du Pont de Nemours and Company, Wilmington, Del., a corporation of Delaware
No Drawing. Filed Dec. 22, 1961, Ser. No. 161,408
9 Claims. (Cl. 117—145)

This invention relates to films and film coatings, more particularly to self-sustaining films of vinylidene chloride copolymers and vinylidene copolymer film coatings for smooth, non-fibrous base sheets of organic material such as regenerated cellulose base films.

Softened regenerated cellulose films coated with vinylidene chloride copolymers display most of the properties of a premium quality, transparent wrapping material. However, the surface properties of such coated films are deficient. The surfaces of vinylidene chloride copolymer coated films tend to be tacky and their slip and release properties are unsatisfactory. The result is that the coated films tend to block or mat in storage and when used in automatic packaging machines tend to cause jamming.

The object of this invention is to provide a vinylidene chloride copolymer film, either self-supporting or as a coating, that has improved surface properties. It is also desirable to improve the durability, heat-sealability, moisture-proofness and the appearance of films coated with vinylidene chloride copolymers. Other objects will appear hereinafter.

The objects are accomplished by utilizing a coating composition comprising an organic solvent solution or an aqueous dispersion of a vinylidene chloride copolymer containing 80–97% vinylidene chloride and 0.5–5%, based on the weight of the copolymer, of an aliphatic monocarboxylic acid amide containing from 12 to 22 carbon atoms and also having dispersed therein 0.2–5%, based on the weight of the copolymer, of mica particles having their largest dimension between 5 and 70 microns.

The solution or dispersion containing 10–25% of the copolymer may be coated on a smooth, non-fibrous base sheet of organic material such as regenerated cellulose film by passing the sheet through a tank containing the solution; removing excess solution from the surface of the sheet; and then driving off the solvent or dispersant to dry the coated sheet. The final coated sheet then contains the copolymer as a film, 0.5–5%, based on the weight of the copolymer, of the acid amide and 0.2–5%, based on the weight of the copolymer, of mica particles uniformly dispersed in the coating. For the purpose of this invention, the thickness of the coating may be anywhere from 2–6 grams/square meter.

When using a solvent solution, the preferred solvent is a mixture of 65% methylethyl ketone and 35% toluene. However, any organic solvent for the copolymer and the amide may be used. A representative list of such solvents follows: cyclohexanone, methylcyclohexanone, tetrahydrofuran, methylethyl ketone, methylisopropyl ketone, methylbutyl(iso-butyl, n-butyl, s-butyl, t-butyl)ketone, methylbenzyl ketone, methylamyl(n-amyl, iso-amyl) ketone, ethylamyl(n-amyl, iso-amyl)ketone, ethylpropyl (n-propyl, iso-propyl)ketone, ethyl-n-butyl ketone and ethylbenzyl ketone.

The vinylidene chloride copolymer is obtained from 80–97% of vinylidene chloride and, correspondingly, 3–20% of at least one other polymerizable mono-olefinic monomer copolymerizable with vinylidene chloride by methods disclosed in U.S. Patent Nos. 2,278,415 (to Arnold) and 2,570,478 (to Pitzl). Although acrylonitrile and alkyl acrylates, e.g. methyl acrylate, are the preferred comonomers, any of a long list may be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate vinyl bromide, styrene, vinyl naphthalene ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single $CH_2$=C< group. The most useful ones fall within the general formula

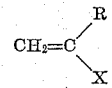

where R may be hydrogen, a halogen or a saturated aliphatic radical and X is selected from one of the following groups:

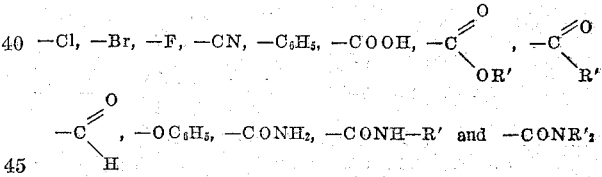

in which R' is alkyl.

As stated previously, the coatings may be applied from aqueous or organic vehicles, i.e. in the form of aqueous dispersions or from solutions in organic solvents. When coating from aqueous dispersions, it is desirable that the copolymer contain an unsaturated aliphatic acid such as itaconic acid, acrylic acid and methacrylic acid as one of its comonomers. The coatings may be applied in accordance with any known coating technique. They may be applied by passing the film through baths in a continuous manner or in a batch manner. The coatings may also be sprayed on the film or be applied manually by brushing or the like.

To obtain the results of the present invention, the size of the mica particles must be in the range of 5–70 microns and the mica should be present in a concentration of 0.2–5%, based on the weight of the copolymer. Particles whose size is less than 5 microns are ineffective for promoting slip, while particles larger than 70 microns tend to produce excessive haze. The optimum concentration of mica in the coating composition depends upon the size of the particles used, the particular fatty acid amide used as well as the concentration of the amide. In general, the optimum concentration of mica will be less when a higher fatty acid amide is used (amide having more than 16 carbon atoms). In any case, concentrations of mica less than 0.2% do not promote slip materially while concentrations above 5% cause roughness in the film surface and tend to decrease the transparency of the film. In most cases, a concentration of mica of 0.8–5%, usually 0.8–1.2% has been found adequate.

The preferred mica for the purpose of this invention is muscovite, $H_2KAl_3(SiO_4)_3$. However, any of the eight types of mica recognized as being distinct minerals may be used in the coating composition of this invention. These include, besides muscovite, paragonite, $$H_2NaAl_3(SiO_4)_3$$

zinwaldite $(KLi)_3FeAl_3Si_5O_{16}(OH,F)_2$; lepidolite, $$KLiAl(OH,F)_2Al(SiO_3)_3$$

phlogopite, $H_2K(Mg,F)_3Mg_3Al(SiO_4)_3$; biotite, $$(H,K)_2(Mg,Fe)_2(Al,Fe)_2(SiO_4)_3$$

lepidomelane, $H_sK_2Fe^{II}Fe_6^{III}Al_3(SiO_4)_9$; and roscoelite, $H_8K(Mg,Fe)(Al,V)_4(SiO_3)_{12}$. It should be pointed out that the light-colored micas tend to minimize haze in a coated film. It should also be pointed out that dry-ground mica is superior to wet-ground mica, apparently because the particles are more spherical in shape and, hence, less dry-ground mica is required to achieve the same results.

Stearamide is the preferred fatty acid amide for use in the composition of this invention principally because it is available and it is cheap. However, any of the saturated or unsaturated fatty acid amides having 12 to 22 carbon atoms may be used. The effectiveness of the fatty acid amides within this group increases with increasing chain length of the amide. Hence, the optimum concentrations of the higher molecular weight amides are lower than the optimum concentrations of the lower molecular weight amides. Thus, from the standpoint of using a minimum concentration of amide, the amides having 16 to 22 carbon atoms, e.g. palmitamide, margaramide, stearamide, nondecanoamide, archodamide, heneicosanoamide and behenamide, are satisfactory. However, it is also necessary that the amides be derived from water-insoluble acids and it is desirable that the amides have melting points of 60° C. or above. From this standpoint, the following amides are preferred: oleamide, erucamide, elaidamide, ricinoleamide and chaumoogramide. It should also be pointed out that the fatty acid amide can be used alone or in a mixture of fatty acid amides to provide the desirable effects of the acid amide in the composition of the invention. In most instances, the commercially available fatty acid amides are mixtures of such amides and may also contain up to about 5% by weight of the free acid or a metallic salt thereof. These commercially available mixtures have been found to be effective in this invention.

In coating regenerated cellulose film with the coating compositions of this invention, it is preferred that the regenerated cellulose film contain from 15–28%, based on the weight of dry cellulose, of a softener for the film. Suitable softeners include propylene glycol, ethylene glycol, glycerine, urea, trimethylene glycol, triethylene glycol, 1,2 botanediol, 2,3 butanediol, 1,3 butanediol, 1,4 butanediol, hexamethylene glycol, ethanolamine, diethanolamine, triethylanolamine, calcuim chloride and various other hygroscopic materials.

It is also preferred that the regenerated cellulose film contain an acid-curable anchorage resin to the extent of 0.2–1.0%, based on the weight of dry cellulose. Such resins are incorporated in the film prior to coating, e.g. in the softening step. Such resins include: urea-formaldehyde resin, guanidine-urea-formaldehyde resin, guanidine-urea-formaldehyde-alcohol resin, melamine-formaldehyde resin, melamine-formaldehyde-polyalkylene-polyamine resin and polyalkylenimine resin.

The following examples are presented to illustrate the invention, Example 1 being the best mode contemplated for practicing the invention.

EXAMPLE 1

A sheet of 450 gauge regenerated cellulose film containing 4% moisture, 23% of a 50/50 mixture of propylene glycol and glycerine and 0.5% of an acid-curable melamine-formaldehyde-polyalkylene-polyamine resin is coated with a composition consisting of:

| | Parts |
|---|---|
| 91:9 vinylidene chloride-acrylonitrile copolymer | 100 |
| Stearamide | 2 |
| Powdered mica (muscoviate particles having largest dimension of 10–50 microns) | 1 |
| Itaconic acid | 1.5 |
| Methylethyl ketone | 385 |
| Toluene | 207 |

After drying the film in the usual manner at an elevated temperature of about 140° C., the dried film is cooled to about 38° C., collected into roll form and stored for about 12 hours.

The resulting coated film is found to operate quite satisfactorily on automatic packaging machines employing heat-sealing operations. The film has good gloss and transparency. Other tests and analysis are run on the coated film to obtain the following results:

| | |
|---|---|
| Coating weight | 4.0 gm./sq. meter |
| Softener (propylene glycol) content | 26%. |
| IPV | 53. |
| Heat-seal strength (5 p.s.i., ¼ sec., 90° C.) | 83 gm./1.5 in. |
| Slip | Grade 1. |
| Matting | Grade 1. |

The details of the methods for testing the film follows:

Coating weight is determined for cellulosic film by soaking the coated film in a hot solution of a sodium alkyl aryl sulfonate in acetic acid and stripping the coating from the film. The stripped coating in the form of a thin film is dried and weighed.

IPV—Initial permeability value is a measure of the moistureproofness of the coated film. The definition for and test for moistureproofness (IPV) are set forth in U.S. Patent 2,147,180 (Ubben). In general, a coated film having an IPV of 100 or less is considered to have satisfactory moisture proofness.

Heat-seal strength is measured by cutting a piece of the coated film 4" x 10" with the grain running in the long or machine direction into two pieces 4" x 5" each. The two pieces are superimposed so that opposite surfaces are in contact. The two pieces of superimposed film are then sealed together at each end at right angles to the grain by applying a ¾" wide sealing bar under carefully controlled conditions of temperature, pressure and contact time. The sealed sheets are then cut in half at right angles to the grain. From the center of the two resulting pieces, 1½" wide strips parallel to the grain are cut. The resulting four sets of strips are tested by opening each set of strips at the free ends, placing them in a Suter testing machine and pulling them apart. The highest force in grams required to pull the strips apart is taken as a measure of the heat-seal bond strength. The conditions used in making the heat seals are given in each example by indicating the heater bar temperature in °C., heater bar pressure as p.s.i., and contact time of heater bar in seconds. Prior to performing this test, the film samples are conditioned for three days at 35% relative humidity.

Slip is defined as the resistance or nonresistance of film to shearing action. It is determined by folding the sheet and applying maximum, uniform squeezing pressure on the folded sheet between the thumb and forefinger and immediately, without releasing pressure, following this with a slow shearing movement of the thumb and forefinger. The sheeets graded as follows:

Grade 1: The surface slides smoothly over itself. Slip is excellent.

Grade 2: The surfaces slide jerkily over themselves, tending to jump or catch (usually at the beginning of the shearing movement). Slip is fair.

Grade 3: The surface does not slide over itself and the thumb and forefinger tend to slip first. Slip is poor.

Matting is defined as the tendency of a film to adhere when two or more surfaces are pressed together. A stack consisting of 30 to 32 3½" x 4" sheets of film, piled back to front throughout the stack is placed on a 3½" x 4" sheet of chipboard and covered with a similar square of chipboard. The assembly is placed on a smooth sheet of metal at least 1/16" thick and approxmiately 6" square. A lead weight with a smooth face (3½" x 4") weighing a total of 4.6 lbs. (⅓ lb. per sq. in.) is placed on top of the stack, and the entire assembly is placed in an oven maintained at 45° C. Care is exercised to prevent disturbing the uniform alignment of the sheets. The weighted sheets are held in the 45° C. oven for a minimum of 24 hours. The stacks are then carefully removed from the oven and allowed to cool to room temperature (30 minutes or more). The chipboard is removed and the stack of film sheets is grasped by thumb and forefinger in the center of the stack. A shearing force is then applied with care taken to avoid bending the stack or disturbing its edges, and the sheets are graded as follows:

Grade 1: The sheets slide apart individually with no tendency whatever to cling together.

Grade 1+: The sheets slide apart individually but with perceptible cling.

Grade 2: The stack separates into two or more groups of sheets which remain moderately firmly matted together.

Grade 2+: The stack separates on application of maximum force into two or more groups of sheets which are firmly matted together.

Grade 3: The stack cannot be separated by straight shearing force and can be separated only by peeling the sheets apart.

"Blocked": Matting is so poor that sheets become firmly cemented together and cannot be separated without damaging them.

EXAMPLES 2-5

A series of coated samples are prepared by applying the coating composition described in Example 1 to a variety of base regenerated cellulose films of different thicknesses and softener contents. All of the samples are coated on both surfaces with a total of 4.0–4.5 grams/ square meter of coating, using essentially identical conditions. The results of these examples are summarized in the following table:

Table I

| Example | Gauge of film | Type softener in film | Percent softener in coated film | IPV of coated film |
|---|---|---|---|---|
| 2 | 300 | Propylene glycol | 18 | 62 |
| 3 | 300 | Propylene glycol-glycerine (50/50). | 22 | 74 |
| 4 | 450 | ___do___ | 24 | 51 |
| 5 | 450 | ___do___ | 28 | 60 |

This data clearly illustrate that the slip agents of this invention do not adversely affect the moistureproofness of highly softened coated films.

EXAMPLES 6-14

Regenerated cellulose base film containing 18% propylene glycol, 0.5% anchorage resin and 4% moisture is used to prepare coated films by applying various vinylidene chloride copolymer coating compositions containing various slip agents within the scope of this invention. In each instance, the coating composition is applied to both surfaces of the base film so as to leave 4.0–4.5 grams/square meter of coating on each sample after drying. The conditions used in each test are given in the following table along with some physical properties of the coated film samples.

Table II

| Ex. | Composition [1] of Copolymer Coating | Fatty Amide Used | Percent Fatty Amide in Coating | Percent Mica in Coating | Film Properties | | | |
|---|---|---|---|---|---|---|---|---|
| | | | | | Slip | Matting | IPV | Heat-Seal Strength (135° C.; 5 p.s.i.; 1/4 sec.) |
| 6 [2] | 95/5-VCl₂/AN | Lauramide | 1 | 1 | 3 | 1+ | 36 | 265 |
| 7 | 90/10-VCl₂/AN | ___do___ | 4 | 2 | 2 | 1 | 48 | 351 |
| 8 | 85/15-VCl₂/AN | Stearamide | 1.5 | 1 | 1 | 1 | 65 | 367 |
| 9 [3] | 93/7/1-VCl₂/MA/IA | ___do___ | 1.0 | 1 | 2 | 1+ | 42 | 354 |
| 10 [4] | 80/20-VCl₂/AN | Behenamide | 2.0 | 1 | 1 | 1 | 83 | 390 |
| 11 | 90/10-VCl₂/AN | ___do___ | 0.1 | 2 | 1 | 1+ | 61 | 378 |
| 12 | 90/10-VCl₂/AN | ___do___ | 1.5 | 0.4 | 2 | 1 | 54 | 356 |
| 13 | 90/10-VCl₂/AN | Oleamide | 2.0 | 1 | 1 | 1 | 50 | 374 |
| 14 | 90/10-VCl₂/AN | Erucamide | 2.0 | 1 | 1 | 1 | 47 | 333 |

[1] VCl₂=Vinylidene Chloride.
 AN=Acrylonitrile.
 MA=Methyl Acrylate.
 IA=Itaconic Acid.
[2] Coating applied from solution in 65/35 mixture of tetrahydrofurane/toluene.
[3] Coating applied from aqueous dispersion.
[4] A nitrocellulose lacquer subcoat of 2 gm./M² was applied prior to top-coating.

Having fully disclosed the invention, what is claimed is:

1. A coated sheet comprising a base sheet of a regenerated cellulose film having on the surface thereof a moistureproof coating having improved slip properties consisting essentially of a vinylidene chloride copolymer containing 80–97% vinylidene chloride and 0.5–5%, based on the weight of said copolymer, of an aliphatic monocarboxylic acid amide containing from 12 to 22 carbon atoms and having dispersed in said coating 0.2–5%, based on the weight of said vinylidene chloride copolymer, of mica particles having their largest dimension between 5 and 70 microns.

2. A coated sheet as in claim 1 wherein said vinylidene chloride copolymer is a vinylidene chlorideacrylonitrile copolymer.

3. A coated sheet as in claim 1 wherein said vinylidene chloride copolymer is a vinylidene chloridemethyl acrylate copolymer.

4. A coated sheet as in claim 1 wherein said aliphatic monocarboxylic acid amide is stearamide.

5. A coated sheet as in claim 1 wherein said aliphatic monocarboxylic acid amide is lauramide.

6. A coated sheet as in claim 1 wherein said aliphatic monocarboxylic acid amide is behenamide.

7. A coated sheet as in claim 1 wherein said aliphatic monocarboxylic acid amide is oleamide.

8. A coated sheet as in claim 1 wherein said aliphatic monocarboxylic acid amide is erucamide.

9. A coated sheet as in claim 1 wherein said mica particles are muscovite particles.

References Cited by the Examiner

UNITED STATES PATENTS

| 2,098,537 | 11/1937 | Charch et al. | 117—145 |
| 2,098,538 | 11/1937 | Charch et al. | 117—145 |
| 2,902,391 | 9/1959 | Daul et al. | 117—145 |
| 2,909,449 | 10/1959 | Banigan | 117—145 |
| 2,953,537 | 9/1960 | McBrien | 260—23 |
| 2,965,591 | 12/1960 | Dazzi | 260—23 |

FOREIGN PATENTS

| 467,901 | 6/1937 | Great Britain. |
| 766,708 | 1/1957 | Great Britain. |

WILLIAM D. MARTIN, *Primary Examiner.*

RICHARD D. NEVIUS, *Examiner.*